United States Patent [19]

Aarts

[11] 4,407,441

[45] Oct. 4, 1983

[54] METHOD OF WELDING AN ALUMINIUM OBJECT TO A STAINLESS STEEL OBJECT

[75] Inventor: Kornelis J. Aarts, Noordwijk, Netherlands

[73] Assignee: Agence Spatiale Europeenne, Paris, France

[21] Appl. No.: 252,168

[22] Filed: Apr. 8, 1981

[30] Foreign Application Priority Data

Apr. 18, 1980 [FR] France ............................. 80 08752

[51] Int. Cl.³ .......................... B23K 31/02; B64G 1/00
[52] U.S. Cl. .................................... 228/176; 228/208; 228/263.17
[58] Field of Search .................... 228/176, 208, 263 E; 428/652

[56] References Cited

U.S. PATENT DOCUMENTS

| | | | |
|---|---|---|---|
| 1,971,761 | 8/1934 | Travers | 428/652 |
| 3,100,338 | 8/1963 | Henry | 228/208 |
| 3,173,202 | 3/1965 | Farber | 228/208 |
| 3,289,293 | 12/1966 | Stenquist | 228/214 |
| 3,368,272 | 2/1968 | Wacongne | 228/263 E |
| 3,872,577 | 3/1975 | Kugler | 228/208 |
| 4,027,367 | 6/1977 | Rondeau | 428/652 |

*Primary Examiner*—Nicholas P. Godici
*Assistant Examiner*—Marc Hodak
*Attorney, Agent, or Firm*—Fred A. Keire

[57] ABSTRACT

The surface of the stainless steel object to be welded is flame sprayed with a powder mixture of aluminium and a metal having a high melting point, e.g. nickel, to form a thin film undercoat which in turn is flame sprayed with a layer of very pure aluminium. The aluminium object is then welded to the coated surface of the stainless steel object using very pure aluminium as filler. Flame spraying is advantageously made using a plasma gas mixture including one part of hydrogen and ten parts of nitrogen. The bonded portions of the two objects may be electroplated with a thin film of nickel.

4 Claims, 2 Drawing Figures

METHOD OF WELDING AN ALUMINIUM OBJECT TO A STAINLESS STEEL OBJECT

BACKGROUND OF THE INVENTION

The present invention relates to the connection of an aluminium object to a stainless steel object. A particular application concerned with the invention is pipe welding in spacecrafts. The following description will refer to this application by way of example only.

Up to now the only method known for connecting an aluminium pipe to a stainless steel pipe is based on forms of mechanical interference or "force fitting". This known method is very complicated and expensive. Therefore, the need arose for a simple and cheap method of joining an aluminium pipe to a stainless steel pipe in such a manner that the thus obtained connection is vacuum tight and capable of withstanding cryogenic temperatures as it is required in space applications.

SUMMARY OF THE INVENTION

The object of the invention is a method of welding an aluminium object to a stainless steel object in such a way that the welded connection is vacuum tight and capable of withstanding cryogenic temperatures.

In accordance with this invention, the surface of the stainless steel object to be welded is first flame sprayed with a powder mixture of aluminium and a metal having a high melting point, e.g. nickel, to form a thin film undercoat. Then, the surface of said undercoat is flame sprayed with a layer of very pure aluminium and thereafter, the aluminium object is welded to the coated surface of the stainless steel object using very pure aluminium as filler.

DESCRIPTION OF AN EXEMPLARY EMBODIMENT

Figure 1:
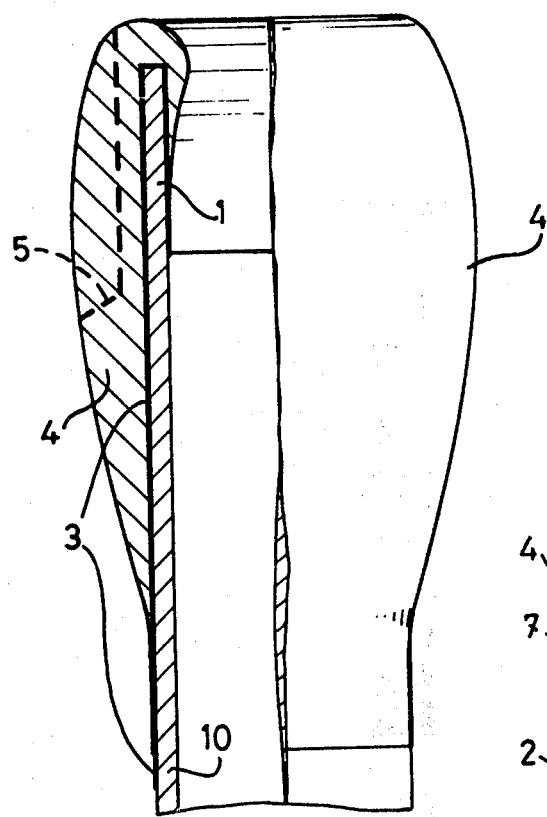
FIG. 1 shows, partially in section, the end of a stainless steel pipe prepared in accordance with this invention for being connected to an aluminium pipe.
Figure 2:
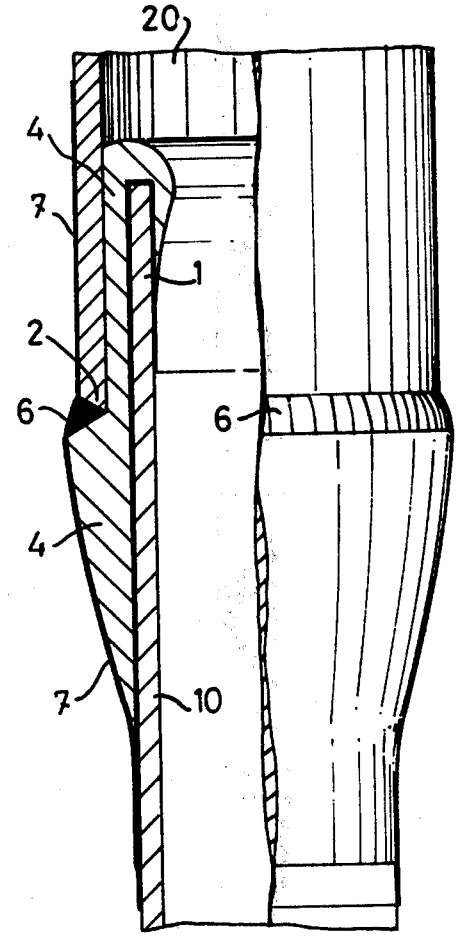
FIG. 2 shows the end of an aluminium pipe connected to the end of the stainless steel pipe of FIG. 1.

Referring to FIG. 1 there is shown the end of a stainless steel pipe 10 to which an aluminium pipe has to be connected. In accordance with this invention, the surface 1 of the stainless steel pipe 10 which is to be welded to the aluminium pipe is flame sprayed with a powder mixture of aluminium and a metal having a high melting point, e.g. nickel, to form a thin film undercoat 3. In an exemplary embodiment, a mixture known under the name METCO 450 (4.5% Al) has been used satisfactorily to form an undercoat of 80 microns thick. The next step consists in flame spraying very pure aluminium onto the film 3 to form a layer 4 of e.g. 4 mm approximately. For instance, use has been made of a powder of spherical aluminium known under the name METCO 54, having a purity of about 99.8%. In the exemplary embodiment illustrated in the drawings, the coating layer 4 has then been machined off over a limited length (shown in broken line in FIG. 1) to form an outer annular edge 5. The coated end 1 of pipe 10 is then introduced into the aluminium pipe 20 (FIG. 2) until the rim 2 of pipe 20 abuts the edge 5 of pipe 10 and the joint formed is then filled with very pure aluminium 6 (e.g. aluminium having a 99.5% purity). For spraying the materials 3 and 4 use is advantageously made of a plasma gas mixture including one part of hydrogen and ten parts of nitrogen.

Tests made have shown that the bond achieved in accordance with this invention is satisfactory. Test with the Edwards leak detector indicated a reading of better than $2.1 \times 10^{-8}$ Torr.l/s, showing the good tight capability of the bond. Further, repeated thermal cycling from $+70°$ C. through $-150°$ C. left the bond with no fractures or other defects.

A further and last step can be performed, which consists in electro-plating the bonded end portions 1 and 2 of the pipes with a thin film of nickel 7.

What is claimed is:

1. A method of welding an aluminum object to a stainless steel object, comprising the steps of:
   flame spraying the surface of the stainless steel object to be welded with a powder mixture including a major proportion of a metal having a high melting point and a minor proportion of aluminum to form a thin film undercoat;
   flame spraying the surface of said undercoat with a layer of very pure aluminum, and
   welding the aluminum object to the aluminum layer on the stainless object using very pure aluminum as a filler.

2. A method according to claim 1, wherein said flame spraying steps use a plasma gas mixture including one part of hydrogen and ten parts of nitrogen.

3. A method according to claim 1, wherein said powder mixture includes aluminium and nickel.

4. A method according to any of claims 1 to 3, further comprising the step of electroplating the bonded end portions of said objects with a thin film of nickel.